(12) United States Patent
Chin

(10) Patent No.: US 8,737,291 B2
(45) Date of Patent: May 27, 2014

(54) METHODS AND SYSTEMS FOR DL-MAP PROCESSING

(75) Inventor: Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 12/343,463

(22) Filed: Dec. 23, 2008

(65) Prior Publication Data

US 2010/0157912 A1 Jun. 24, 2010

(51) Int. Cl.
*H04B 7/204* (2006.01)

(52) U.S. Cl.
USPC ............ 370/319; 370/330; 370/344; 370/347

(58) Field of Classification Search
USPC .......................... 370/319, 330, 343, 344, 347
See application file for complete search history.

(56) References Cited

U.S. PATENT DOCUMENTS

| | | | | |
|---|---|---|---|---|
| 7,751,361 | B2 * | 7/2010 | Katis et al. | 370/328 |
| 2005/0044261 | A1 * | 2/2005 | Saxena | 709/236 |
| 2006/0153112 | A1 * | 7/2006 | Lim et al. | 370/310 |
| 2006/0195767 | A1 | 8/2006 | Ihm et al. | |
| 2007/0060146 | A1 | 3/2007 | Won et al. | |
| 2009/0279501 | A1 * | 11/2009 | Tsai et al. | 370/330 |

FOREIGN PATENT DOCUMENTS

| | | |
|---|---|---|
| CN | 1805434 A | 7/2006 |
| CN | 101371527 A | 2/2009 |
| EP | 1533927 A1 | 5/2005 |
| EP | 1672842 | 6/2006 |
| EP | 1746855 A2 | 1/2007 |
| TW | 200706042 | 2/2007 |
| TW | 201108819 A | 3/2011 |
| WO | 2007011180 A1 | 1/2007 |
| WO | WO-2007078068 A1 | 7/2007 |
| WO | 2008122841 A1 | 10/2008 |

OTHER PUBLICATIONS

Broadband Radio Access Networks (BRAN); HiperMAN; Data Link Control (DLC) layer; ETSI TS 102 178""ETSI Standards, LIS, Sophia Antipolis Cedex, France, vol. BRAN, No. V1.4.1,Nov. 1, 2007, XP0140404901SSN: 0000-0001.
International Search Report and Written Opinion—PCT/US2009/068603, International Search Authority—European Patent Office—Jul. 7, 2010.

(Continued)

*Primary Examiner* — Alvin Zhu
(74) *Attorney, Agent, or Firm* — Tyler J. Overall

(57) ABSTRACT

Methods and apparatus for processing a downlink (DL) subframe of an orthogonal frequency-division multiplexing (OFDM) or an orthogonal frequency division multiple access (OFDMA) frame are provided. By arranging the DL-MAP information elements (IEs) in a DL-MAP of the DL subframe to correspond chronologically to the arrangement of their associated data bursts in the OFDM or OFDMA frame at a base station (BS), a user terminal receiving that frame may be able to start decoding the data bursts in the DL subframe without having to wait until all of the DL-MAP IEs have been parsed and decoded. In this manner, the user terminal may decode the data bursts while simultaneously parsing a remaining portion of the DL-MAP, and the time for processing the entire frame may be reduced, thereby increasing the processing speed.

44 Claims, 14 Drawing Sheets

(56) References Cited

OTHER PUBLICATIONS

IEEE Computer Society and IEEE Microwave Theory and Techniques Society: "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16-2004/Cort-2005; IEEE Standard; Piscataway, NJ, USA, (Feb. 28, 2006), p. 1, 44-50, 228-230, 672-677, XP002551992 * sections 6.3.2.3 to 6.3.2.3.2 * * section 6.3.21.1* * section 11.4.2 *.

Intel, "Time order of allocations in DL-MA", C80216e-04-216, IEEE Draft; C80216E-04-216, IEEE-SA, Piscataway, NJ USA, vol. 802.16e, Jun. 25, 2004, pp. 1-2, XP017623928, [retrieved on Jun. 27, 2004].

Taiwan Search Report—TW098144548—TIPO—Jan. 28, 2013.

* cited by examiner

| FCH(DLFP)_Message_Format | |
|---|---|
| Used SCH bitmap: <br> A bitmap indicating which groups of SCH are used on the 1st PUSC zone and on PUSC zones in which 'use all SC' indicator is set to '0' in STC_DL_Zone_IE0. Value 1 means used by this segment and 0 means not used. <br>                       2048     1024     512     128 <br>   bit 0: SCH Group 0   0~11(12)   0~ 5(6)   0~4(5)   0(1) <br>   bit 1: SCH Group 1   12~19( 8)   6~ 9(4)   NA   NA <br>   bit 2: SCH Group 2   20~31(12)   10~15(6)   5~9(5)   1(1) <br>   bit 3: SCH Group 3   32~39( 8)   16~19(4)   NA   NA <br>   bit 4: SCH Group 4   40~51(12)   20~25(6)   10~14(5)   2(1) <br>   bit 5: SCH Group 5   52~59( 8)   26~29(4)   NA   NA | 6 bits |
| Reserved: set to 0 | 1 bit |
| Repetition Coding Indication: on DL-MAP <br> No additional Rep=total 1 (0), 1 additional Rep=total 2 (1), <br> 3 additional Rep=total 4 (2), 5 additional Rep=total 6 (3) | 2 bits |
| Coding Indication: on DL-MAP <br> DL-MAP shall be transmitted with QPSK at FEC rate 1/2 <br> The BS ensures that DL-MAP (and other MAC msg required for SS operation) are sent with the mandatory coding scheme often enough to ensure uninterrupted operation of SS supporting only the mandatory coding scheme. <br><br> CC(0), BTC(1), CTC(2), ZTCC(3), CC w/opt INT(4), LDPC(5) | 3 bits |
| DL-MAP Length: <br> Defines the length in slots of the DL-MAP msg that follows immediately the DLFP, after repetition code is applied. | 8 bits |
| Reserved: set to 0 | 4 bits |

FIG. 4B

| Information Element | Size |
| --- | --- |
| Management Message Type = 2 | 8 bits |
| Frame Duration Code | 8 bits |
| Frame Number | 24 bits |
| DCD Count | 8 bits |
| Base Station ID | 48 bits |
| No. OFDMA Symbols in DL Subframe | 8 bits |
| DL-MAP_IE 1 | Variable |
| DL-MAP_IE 2 | Variable |
| ⋮ | |
| DL-MAP_IE n | Variable |
| Padding | 0 or 4 bits |

FIG. 5B

METHODS AND SYSTEMS FOR DL-MAP PROCESSING

TECHNICAL FIELD

Certain embodiments of the present disclosure generally relate to wireless communication and, more particularly, to downlink (DL)-MAP processing of orthogonal frequency-division multiplexing (OFDM) or orthogonal frequency division multiple access (OFDMA) frames.

SUMMARY

Certain embodiments of the present disclosure generally relate to streamlined downlink (DL)-MAP processing of orthogonal frequency-division multiplexing (OFDM) or orthogonal frequency division multiple access (OFDMA) frames. By arranging the DL-MAP information elements (IEs) for locating data bursts to have the same temporal order in the DL-MAP as the corresponding DL data bursts in the OFDM or OFDMA frame at a base station (BS), a user terminal receiving that frame may be able to decode the data bursts in the frame without having to wait until all of the DL-MAP IEs have been parsed and decoded. In this manner, the overall processing time per frame may be reduced, and the time constraints for parsing the DL-MAP and/or for decoding the data bursts may be relaxed.

Certain embodiments of the present disclosure provide a method of wireless communications via OFDM or OFDMA. The method generally includes generating an OFDM or OFDMA frame having a DL-MAP and two or more data bursts, the data bursts having a temporal order; arranging two or more DL-MAP IEs for locating the data bursts to have the same temporal order in the DL-MAP as the data bursts; and transmitting a signal based on the OFDM or OFDMA frame with the arranged DL-MAP IEs.

Certain embodiments of the present disclosure provide a computer-program product for wireless communications via OFDM or OFDMA. The computer-program product typically includes a computer-readable medium having instructions stored thereon, the instructions being executable by one or more processors. The instructions generally include instructions for generating an OFDM or OFDMA frame having a DL-MAP and two or more data bursts, the data bursts having a temporal order; instructions for arranging two or more DL-MAP IEs for locating the data bursts to have the same temporal order in the DL-MAP as the data bursts; and instructions for transmitting a signal based on the OFDM or OFDMA frame with the arranged DL-MAP IEs.

Certain embodiments of the present disclosure provide an apparatus for wireless communications via OFDM or OFDMA. The apparatus generally includes means for generating an OFDM or OFDMA frame having a DL-MAP and two or more data bursts, the data bursts having a temporal order; means for arranging two or more DL-MAP IEs for locating the data bursts to have the same temporal order in the DL-MAP as the data bursts; and means for transmitting a signal based on the OFDM or OFDMA frame with the arranged DL-MAP IEs.

Certain embodiments of the present disclosure provide a base station for wireless communications via OFDM or OFDMA. The base station generally includes logic for generating an OFDM or OFDMA frame having a DL-MAP and two or more data bursts, the data bursts having a temporal order; logic for arranging two or more DL-MAP IEs for locating the data bursts to have the same temporal order in the DL-MAP as the data bursts; and a transmitter front end configured to transmit a signal based on the OFDM or OFDMA frame with the arranged DL-MAP IEs.

Certain embodiments of the present disclosure provide a method of wireless communications via OFDM or OFDMA. The method generally includes receiving a signal based on an OFDM or OFDMA frame having a DL-MAP and one or more data bursts, parsing the DL-MAP to determine one or more DL-MAP IEs contained therein, and decoding the data bursts based on the DL-MAP IEs while parsing at least a portion of the DL-MAP.

Certain embodiments of the present disclosure provide a computer-program product for wireless communications via OFDM or OFDMA. The computer-program product typically includes a computer-readable medium having instructions stored thereon, the instructions being executable by one or more processors. The instructions generally include instructions for receiving a signal based on an OFDM or OFDMA frame having a DL-MAP and one or more data bursts, instructions for parsing the DL-MAP to determine one or more DL-MAP IEs contained therein for locating the data bursts, and instructions for decoding the data bursts based on the DL-MAP IEs while parsing at least a portion of the DL-MAP.

Certain embodiments of the present disclosure provide an apparatus for wireless communications via OFDM or OFDMA. The apparatus generally includes means for receiving a signal based on an OFDM or OFDMA frame having a DL-MAP and one or more data bursts, means for parsing the DL-MAP to determine one or more DL-MAP IEs contained therein for locating the data bursts, and means for decoding the data bursts based on the DL-MAP IEs while parsing at least a portion of the DL-MAP.

Certain embodiments of the present disclosure provide a mobile device. The mobile device generally includes a receiver front end configured to receive a signal based on an OFDM or OFDMA frame having a DL-MAP and one or more data bursts, a MAP parser configured to parse the DL-MAP to determine one or more DL-MAP IEs contained therein for locating the data bursts, and a data burst decoder configured to decode the data bursts based on the DL-MAP IEs while parsing at least a portion of the DL-MAP.

Certain embodiments of the present disclosure, for example as presented in the summary paragraphs above, wherein the OFDM or OFDMA frame has a format in accordance with one or more standards of the Institute of Electrical and Electronics Engineers (IEEE) 802.16 family of standards

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

FIGS. 5A and 5B illustrate the format of and the bit size of entries in a downlink map (DL-MAP) message with a generic DL-MAP information element (IE), in accordance with certain embodiments of the present disclosure.

DETAILED DESCRIPTION

Figure 1:
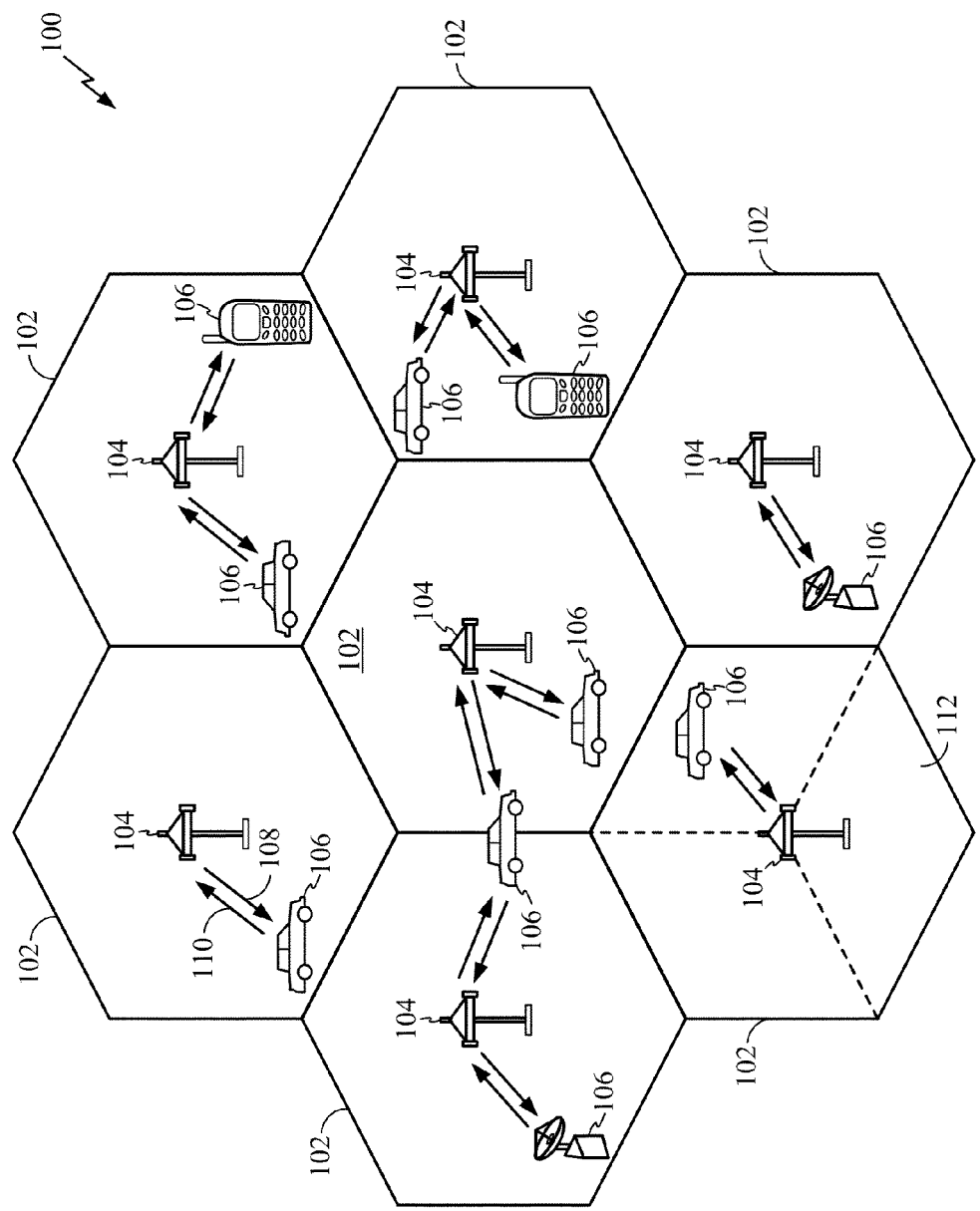
FIG. 1 illustrates an example wireless communication system, in accordance with certain embodiments of the present disclosure.

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standard for the OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis.

Therefore, a receiver, such as a mobile station, first decodes the FCH to determine the position of the DL-MAP, decodes the DL-MAP of the corresponding position, determines the allocation of the data bursts within the frame, decodes the data bursts, and extracts the data. Due to the nature of the information in the DL-MAP, if the reception of the DL-MAP fails or the DL-MAP is decoded incorrectly, the following downlink operations on the receiver side cannot be properly executed. Accordingly, proper interpretation of the DL-MAP is important to OFDM and OFDMA system operation.

Certain embodiments of the present disclosure provide techniques and apparatus for processing a downlink (DL) subframe of an orthogonal frequency-division multiplexing (OFDM) or an orthogonal frequency division multiple access (OFDMA) frame. By arranging the DL-MAP information elements (IEs) in a DL-MAP of the DL subframe to correspond chronologically to the arrangement of their associated data bursts in the OFDM or OFDMA frame at a base station (BS), a user terminal receiving that frame may be able to start decoding the data bursts in the DL subframe without having to wait until all of the DL-MAP IEs have been parsed and decoded. In this manner, the user terminal may decode the data bursts while simultaneously parsing a remaining portion of the DL-MAP, and the time for processing the entire frame may be reduced, thereby increasing the processing speed.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
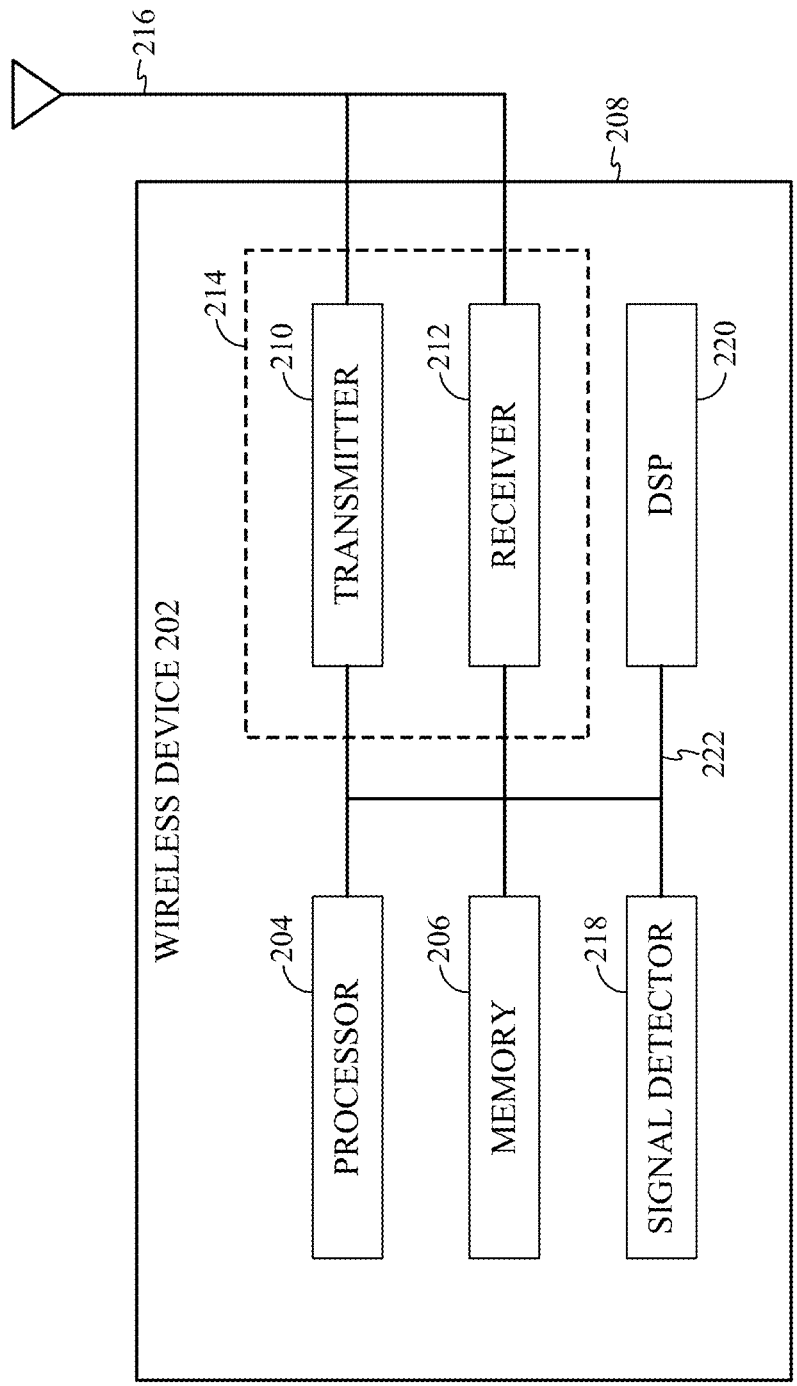
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
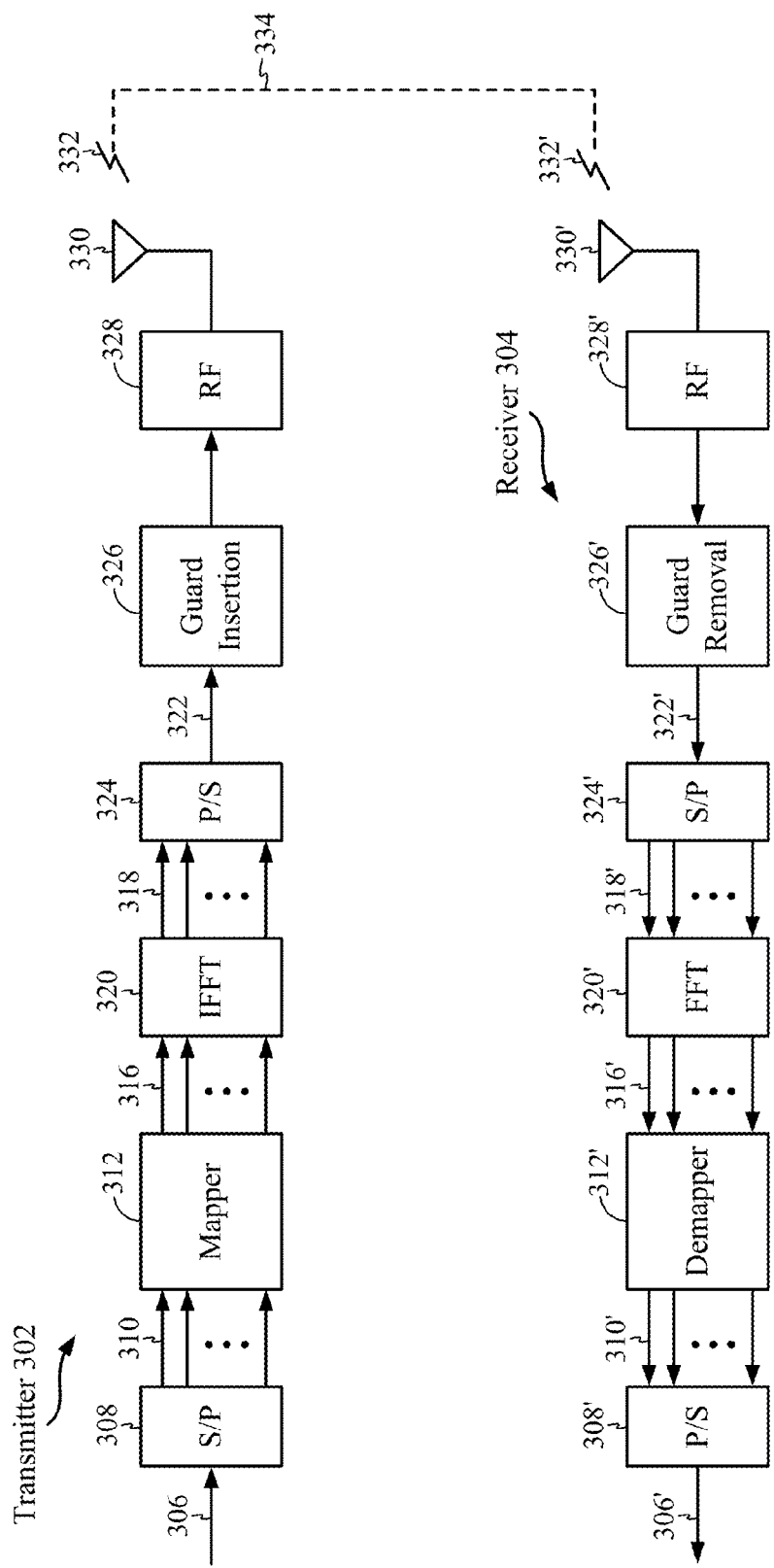
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain.

One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4A:
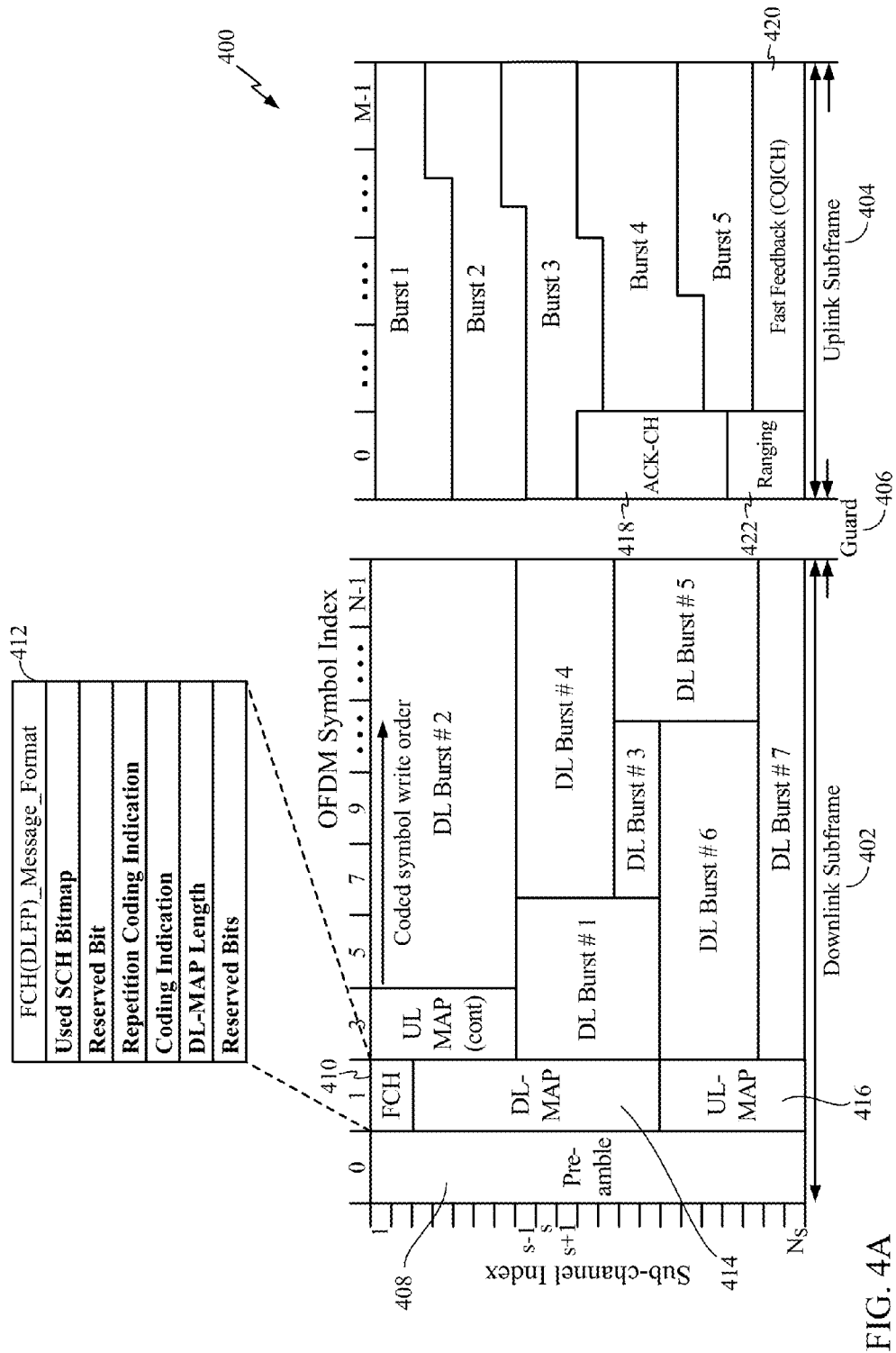

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel quality information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP and DL-MAP IEs

Figure 5A:
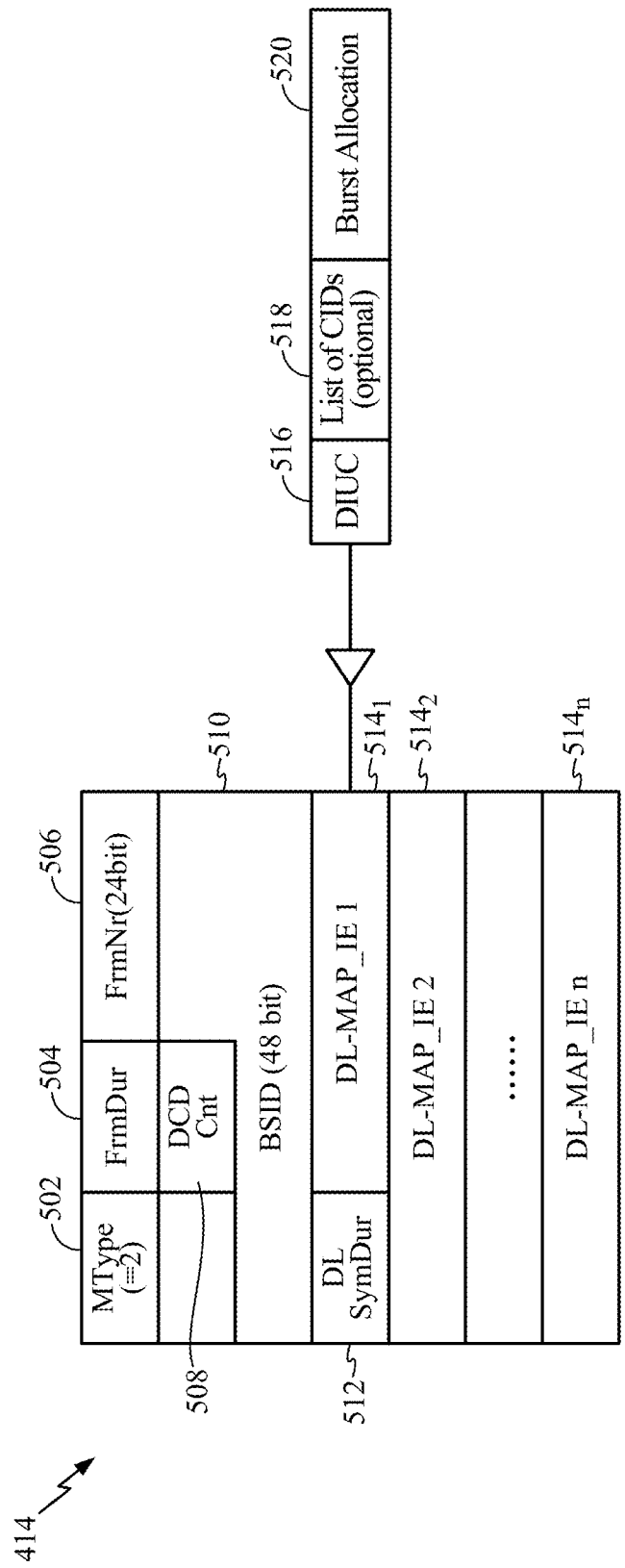

The DL-MAP 414 of FIG. 4A is illustrated in more detail in FIG. 5A with FIG. 5B illustrating the length in bits of each component of the DL-MAP 414. The DL-MAP 414 may begin with a Management Message Type 502 having a length of 8 bits, which has a value of 2 (00000010b) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to the downlink channel configuration of the sector. The DCD count 508 may be followed by a base station identifier (BSID) 510, having a length of 6 bytes (48 bits). The BSID 510 may uniquely identify the base station in the network and may be followed by a DL symbol duration 512 indicating a number of OFDMA symbols in the DL subframe 402 and having a length of 8 bits.

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5A, some embodiments of the DL-MAP 414 may include padding having a length of 4 bits in an effort to reach a byte boundary for the DL-MAP 414.

Exemplary DL-MAP Processing from the BS Perspective

As described and illustrated above, a user terminal 106 may receive an OFDM/OFDMA frame 400 with the DL-MAP 414 starting at the second symbol of the DL subframe 402 (i.e., the first symbol after the preamble 408). In some frames, the DL-MAP 414 may occupy several symbols. In a typical method for parsing and decoding the DL-MAP IEs 514 contained in the DL-MAP 414, the user terminal 106 may wait until all the bits associated with the DL-MAP symbols have been received before starting to parse the DL-MAP. However, this may tighten the timeline allocated for parsing the DL-MAP because processing of the entire frame can only start from the last symbol of the DL-MAP 414.

Accordingly, techniques and apparatus for alleviating the time constraints on the DL-MAP parsing are needed.

Figure 6:
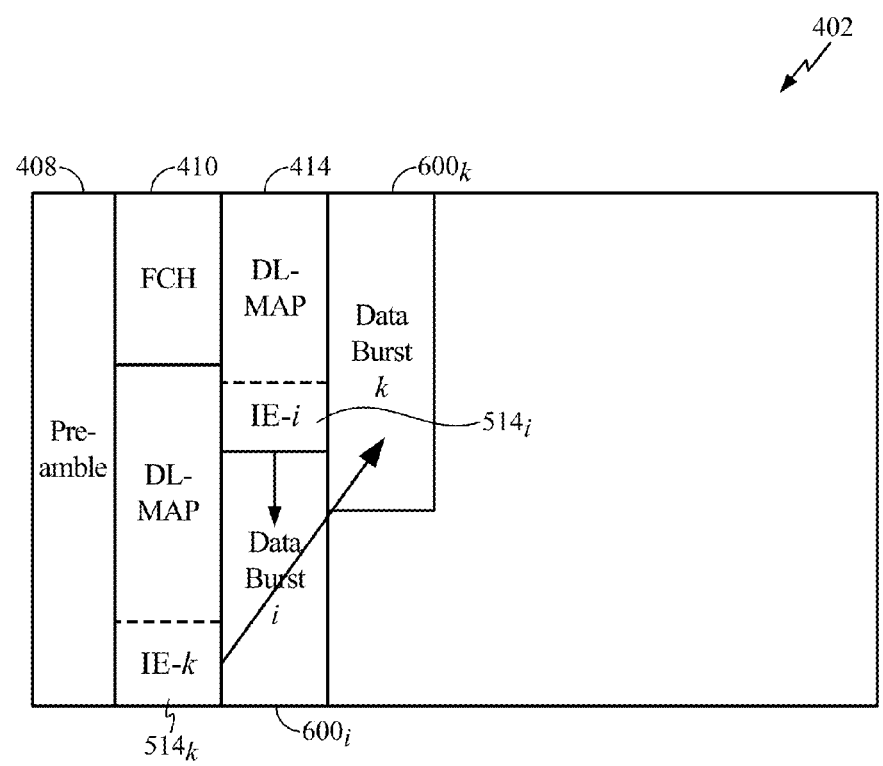
FIG. 6 illustrates an example DL subframe where the DL-MAP IEs are arranged in any order within the DL-MAP and do not correspond to the chronological order of the DL data bursts, in accordance with certain embodiments of the present disclosure.

Before proposing a solution, the nature of the problem must be further investigated. FIG. 6 illustrates a typical representative DL subframe 402 where the DL data bursts 600 are arranged in a certain order. The data bursts 600 may be arranged in the DL subframe 402 by a MAP builder located in the BS 104 and operating at the physical layer (PHY) to construct the OFDM or OFDMA frames according to classification and scheduling information. However, the DL-MAP IEs 514 for locating these data bursts 600 may be arranged in any order, irrespective of the order of the data bursts. For example, even though data burst i appears earlier than data burst k in the DL subframe 402 of FIG. 6, DL-MAP IE k (used for locating data burst k) appears before DL-MAP IE i (used for locating data burst i). And this example only involves two data bursts 600. With an even greater number of DL-MAP IEs 514, the sequence of DL-MAP IEs with respect to the temporal order of the data bursts 600 may appear to be even more dissociative. Furthermore, there may also be control IEs within the DL-MAP 414, which can also affect the temporal order of the DL-MAP IEs for locating the data bursts.

However, if the DL-MAP IEs 514 for locating the DL data bursts 600 were arranged in the DL-MAP 414 to match the chronological order of the corresponding data bursts by the base station 104 and transmitted, then the user terminal 106 receiving the transmitted OFDM/OFDMA frame could decode the DL data bursts 600 while parsing the DL-MAP 414 simultaneously. In this manner, the user terminal 106 may start decoding the first data burst 600 (i.e., the earliest received data burst or the data burst having the earliest symbol) as soon as the DL-MAP IE 514 corresponding to this particular data burst is parsed and decoded and the first data burst is available for decoding, without waiting for all of the DL-MAP to be parsed. Thereby, the time for processing the entire OFDM/OFDMA frame may be reduced, thereby increasing the processing speed.

Figure 7:
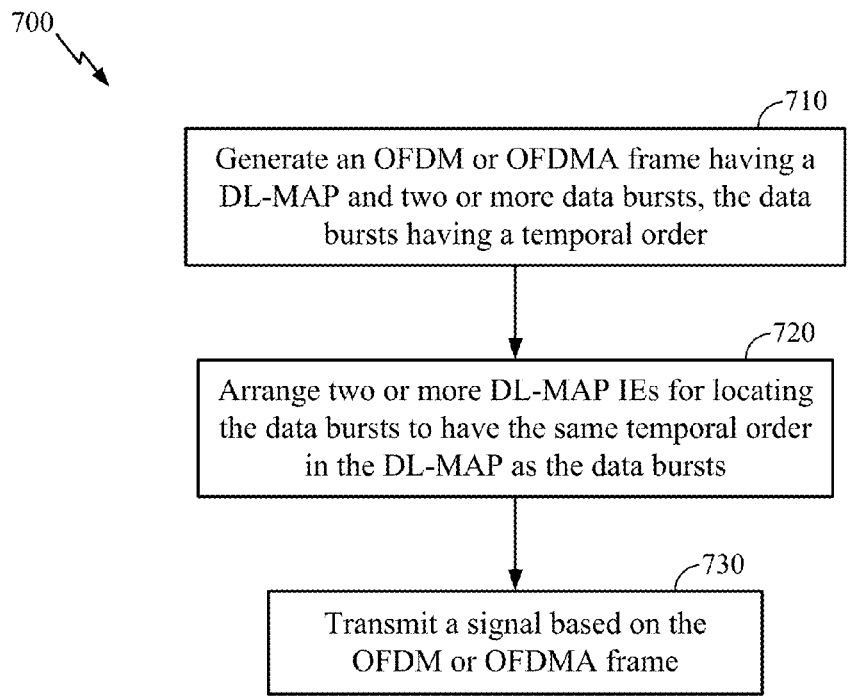
FIG. 7 is a flow chart of example operations for transmitting an OFDM/OFDMA frame having DL-MAP IEs that correspond to DL data bursts in the frame chronologically, in accordance with certain embodiments of the present disclosure.

FIG. 7 is a flow chart of example operations 700 for transmitting an OFDM/OFDMA frame 400 having DL-MAP IEs 514 that correspond to DL data bursts 600 in the frame chronologically, in accordance with certain embodiments of the present disclosure. The operations 700 may begin, at 710, by generating an OFDM or OFDMA frame having a DL-MAP 414 and two or more data bursts 600. The data bursts 600 have a certain temporal order in the frame, which may be determined by a MAP builder in the base station 104 according to the classification and scheduling information. For some embodiments, the temporal order of the DL data bursts 600 may be considered as the sequence of data bursts beginning with the data burst having the earliest starting symbol and ending with the data burst having the latest starting symbol in the DL subframe 402. For other embodiments, the temporal order of the DL data bursts 600 may be considered as the sequence of data bursts beginning with the data burst having the earliest ending symbol and terminating with the data burst having the latest ending symbol in the DL subframe 402.

At 720, the DL-MAP IEs 514 for locating the DL data bursts 600 may be arranged such that the DL-MAP IEs have the same temporal order in the DL-MAP 414 as the data bursts. In other words, the DL-MAP IEs 514 for locating the data bursts may correspond chronologically to the data bursts within a single frame.

Figure 8:
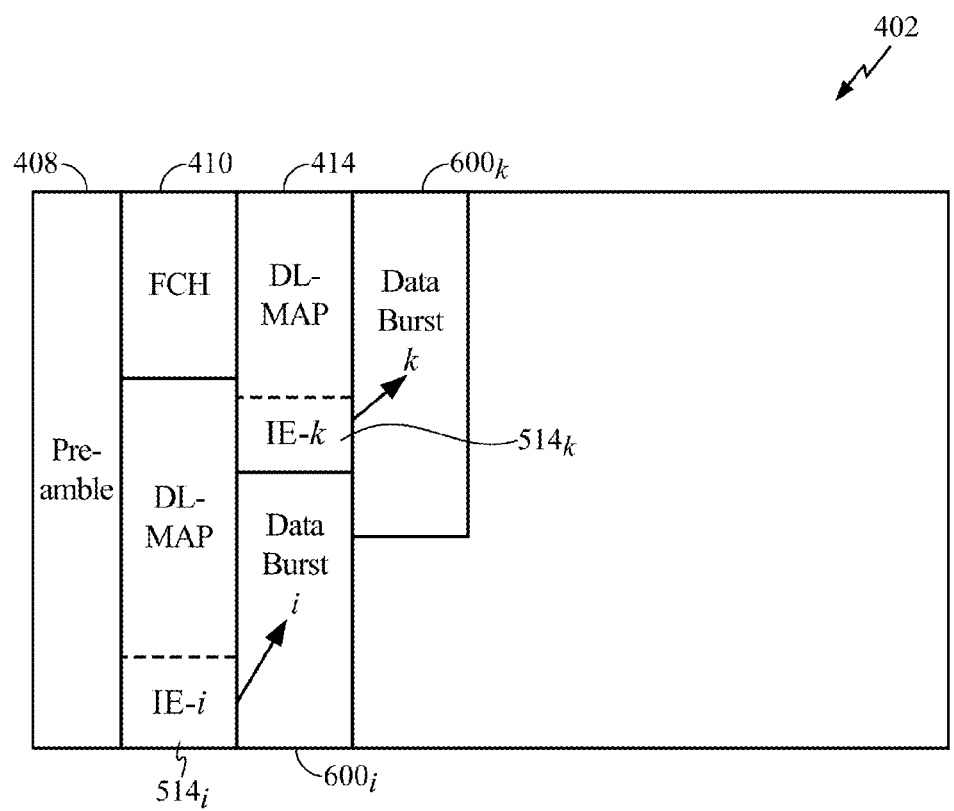
FIG. 8 illustrates an example DL subframe where the DL-MAP IEs are arranged in the DL-MAP to correspond to the chronological order of the DL data bursts, in accordance with certain embodiments of the present disclosure.

FIG. 8 illustrates an example DL subframe 402 where the DL-MAP IEs 514 are arranged in the DL-MAP 414 to correspond to the chronological order of the DL data bursts 600, in accordance with certain embodiments of the present disclosure. As portrayed in FIG. 8, data burst i appears earlier than data burst k in the DL subframe 402. This is true whether the starting symbols of the data bursts i and k are regarded as defining the temporal order or the ending symbols are considered. Likewise, DL-MAP IE i appears before DL-MAP IE k in the DL-MAP 414.

If two data bursts 600 share the same starting symbol (or the same ending symbol for some embodiments), the order of the DL-MAP IEs 514 corresponding to these particular two data bursts may be reversible. That means, if DL-MAP IE i appears earlier than another DL-MAP IE k in the DL-MAP 414, then the data burst i allocated by DL-MAP IE i starts from (or ends at) a symbol no later than the start (or the end) of the data burst k allocated by DL-MAP IE k. Swapping the order of two such DL-MAP IEs may most likely not affect the data burst decoding while parsing the DL-MAP at the user terminal 106, as described in greater detail below.

Returning to FIG. 7, once the OFDM/OFDMA frame 400 has been arranged at 720, the base station 104 may transmit a signal based on the frame at 730. The operations 700 may be repeated for every OFDM/OFDMA frame 400 containing DL data bursts 600.

Exemplary DL-MAP Processing from the MX Perspective

Signals based on the constructed OFDM or OFDMA frames may be broadcast by the base station 104 and received by the user terminal 106. At the user terminal 106, the received signals may be processed such that a MAP parser, for example, may locate DL data bursts 600 within each DL subframe 402 according to the DL-MAP 414 and the DL-MAP IEs 514 contained therein.

Figure 9:
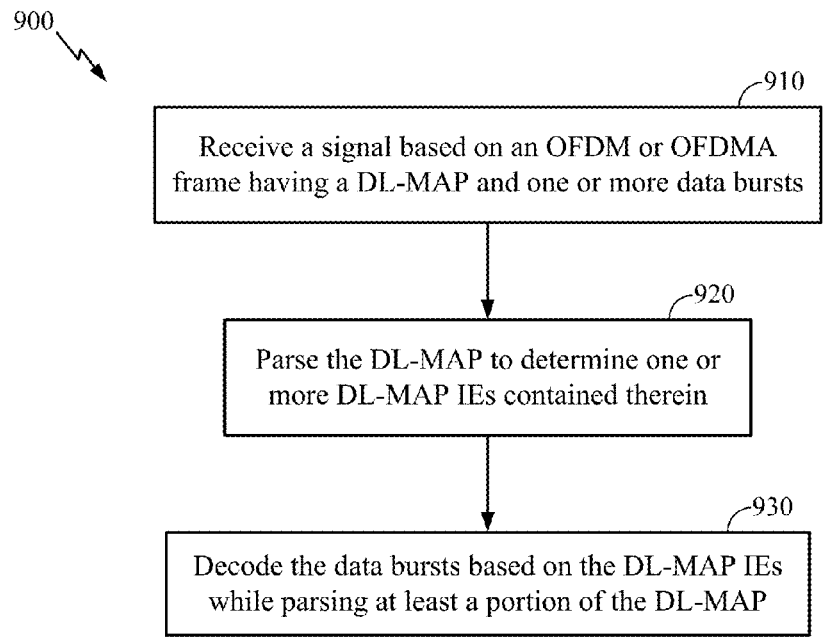
FIG. 9 is a flow chart of example operations for performing DL data burst decoding while parsing the DL-MAP of an OFDM/OFDMA frame, in accordance with certain embodiments of the present disclosure.
Figure 10:
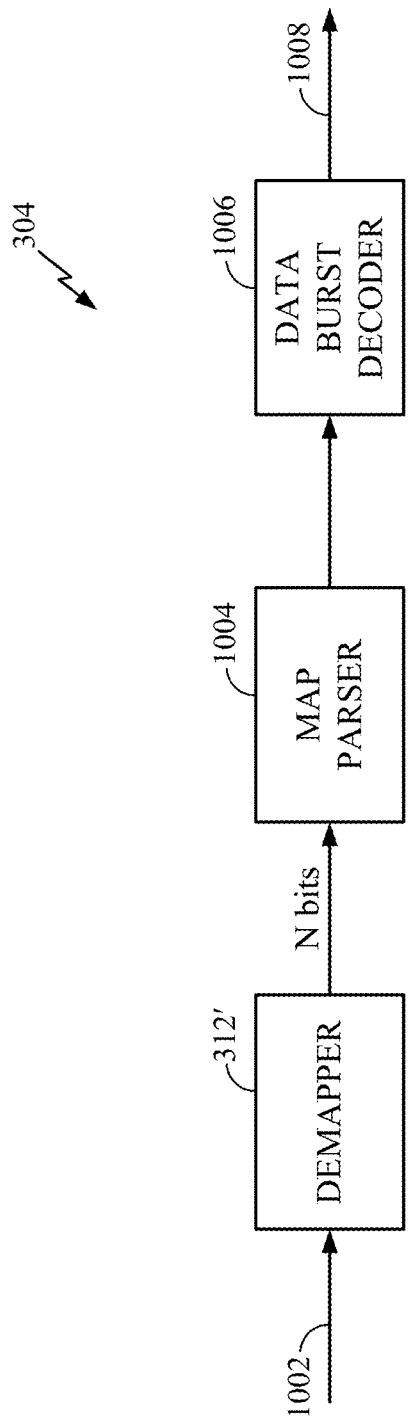
FIG. 10 illustrates additional example signal processing elements of the example receiver of FIG. 3 for DL-MAP parsing and data burst decoding, in accordance with certain embodiments of the present disclosure.

FIG. 9 is a flow chart of example operations 900 for performing DL data burst decoding while parsing the DL-MAP 414 of an OFDM/OFDMA frame 400, in accordance with certain embodiments of the present disclosure. The operations 900 may begin, at 910, by receiving a signal based on an OFDM/OFDMA frame 400 having a DL-MAP 414 and one or more DL data bursts 600. As described above with respect to FIG. 3, the user terminal 106 may include a receiver 304 with a demapper 312' (a decoder). The signal received at 910 may be signal processed in the receiver 304 to form frequency-domain data 1002 (e.g., frequency-domain symbol streams 316' of FIG. 3), which may be decoded according to a symbol map by the demapper 312', for example, into a data stream as illustrated in FIG. 10.

At 920, the DL-MAP 414 may be parsed to determine one or more DL-MAP IEs 514 contained therein. A MAP parser 1004 may receive the data stream bits and parse the DL-MAP 414 into the various control IEs and DL-MAP IEs 514 for locating DL data bursts 600.

At 930, the data bursts 600 may be decoded based on the allocation information in the DL-MAP IEs 514 while at least a portion of the DL-MAP 414 is being parsed. The data bursts 600 may be decoded in a data burst decoder 1006 to output the data 1008 contained therein.

Figure 11:
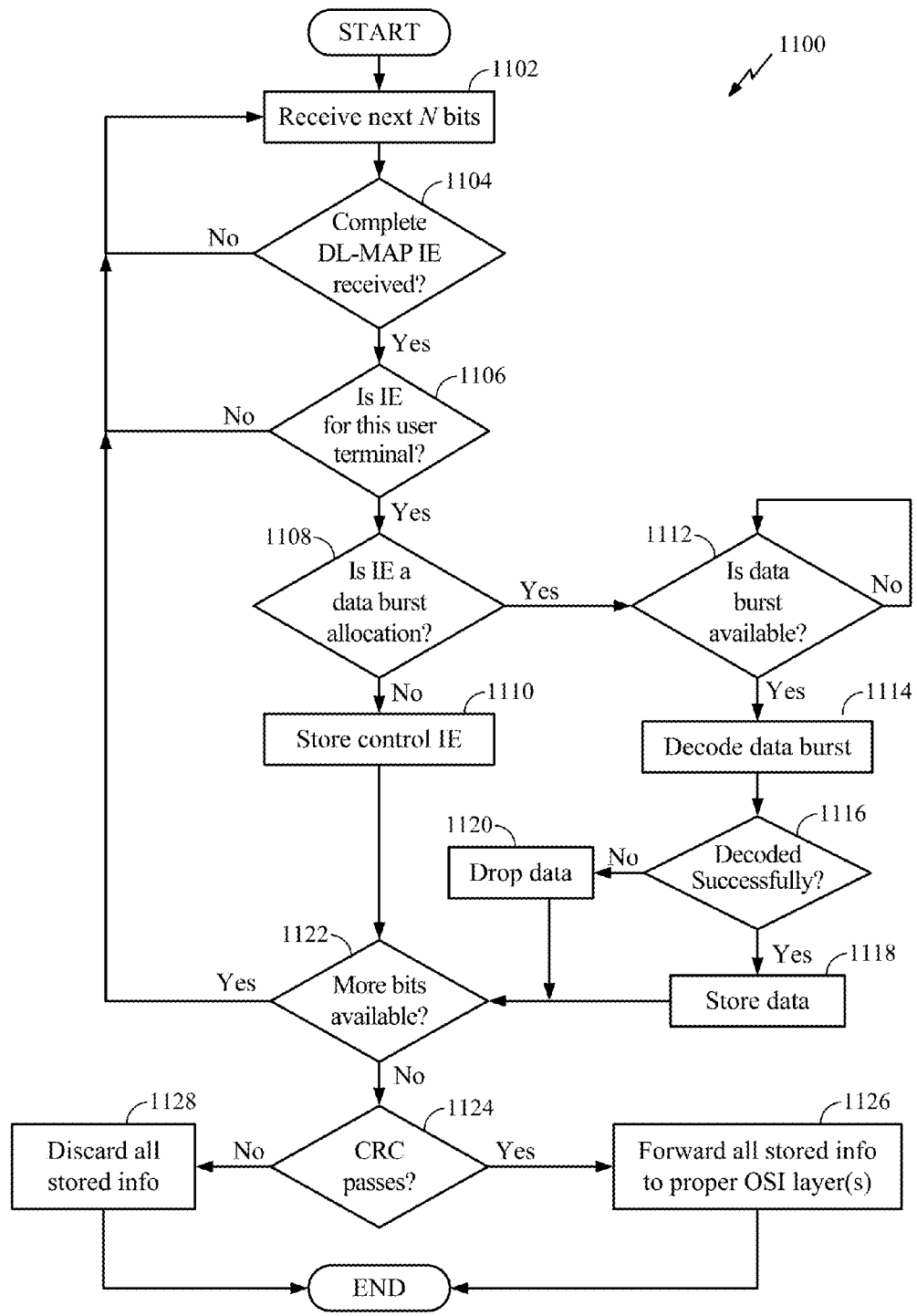
FIG. 11 is a flow chart of detailed example operations for decoding data bursts while parsing the DL-MAP IEs of the DL-MAP, in accordance with certain embodiments of the present disclosure.

FIG. 11 is a flow chart of detailed example operations 1100 for decoding DL data bursts 600 while parsing the DL-MAP IEs 514 of the DL-MAP 414 for a single OFDM/OFDMA frame 400, in accordance with certain embodiments of the present disclosure. The operations 1100 may begin, at 1102, by receiving a certain number N of bits from the decoder (i.e., the demapper 312'). The decoder may output the N bits to the MAP parser 1004 so that the MAP parser may parse the DL-MAP 414 into individual DL-MAP IEs 514. The parameter N may be chosen to cover at least the PHY layer decoder's block size.

Once the MAP parser 1004 receives the next N bits, the MAP parser may determine if a complete DL-MAP IE 514 has been received at 1104. If not, the MAP parser 1004 may receive an additional N bits from the demapper 312' at 1102. This loop may repeat until the MAP parser 1004 receives a complete DL-MAP IE 514.

At 1106, the user terminal 106 may determine if the parsed DL-MAP IE 514 is of interest to the user terminal, perhaps based on the list of CIDs 518 in the DL-MAP IE. If the DL-MAP IE 514 is not intended for use by this user terminal 106, the MAP parser 1004 may obtain the next N bits from the decoder at 1102. If the parsed DL-MAP IE 514 is intended for this user terminal 106, then at 1108, the user terminal may determine whether or not the parsed DL-MAP IE is a data burst allocation.

If the parsed DL-MAP IE 514 is not a data burst allocation, then the DL-MAP IE may be a control IE. At 1110, this control IE may be stored in memory.

If the parsed DL-MAP IE 514 is determined to be a data burst allocation at 1108, the user terminal 106 may determine if the corresponding data burst 600 is available at the output of the decoder at 1112. If the data burst 600 is not available at the decoder output, then the data burst decoder 1006 may temporarily store the IE until the data burst is available. However, if the data burst 600 is available, the data burst decoder 1006 may decode the data burst at 1114. For some embodiments, the data burst decoder 1006 may decode the data burst as soon as the data burst is available, regardless of whether all of the DL-MAP 414 has been parsed. In other words, the user terminal 106 may start decoding the data bursts 600 before the DL-MAP parsing has been completed.

At 1116, the user terminal 106 may determine whether the data burst 600 was successfully decoded at 1114. This decoding check may be performed, for example, by checking a MAC protocol data unit (MPDU) cyclic redundancy check (CRC) or Header Check Sequence (HCS) of the decoded data burst. If the data burst 600 is determined to be successfully decoded, the data 1008 contained within the data burst may be stored at 1118. However, if the data burst 600 is not decoded successfully, then the data 1008 or the data burst may be dropped at 1120.

If there are more bits available for the MAP parser 1004 to receive at 1122, then the MAP parser may receive the next N bits at 1102, and the operations 1100 described above may repeat up to determining if more bits are available at 1122. By repeating these operations, all of the DL-MAP IEs 514 (including both control IEs and IEs for locating data bursts) may be parsed while decoding all of the data bursts 600 at the same time, or at least as soon as the data burst becomes available.

Once there are no more bits from the decoder, the MAP parser 1004 may determine if the CRC of the DL-MAP 414 passes at 1124. If the CRC passes, all the stored control IEs and the stored data may be forwarded to the proper layers (e.g., the MAC sublayer or the network layer) according to the Open Systems Interconnection (OSI) Reference Model at 1126. Otherwise, all the information (e.g., the stored control IEs and the stored data) may be discarded at 1128.

Figures 12A, 12B:
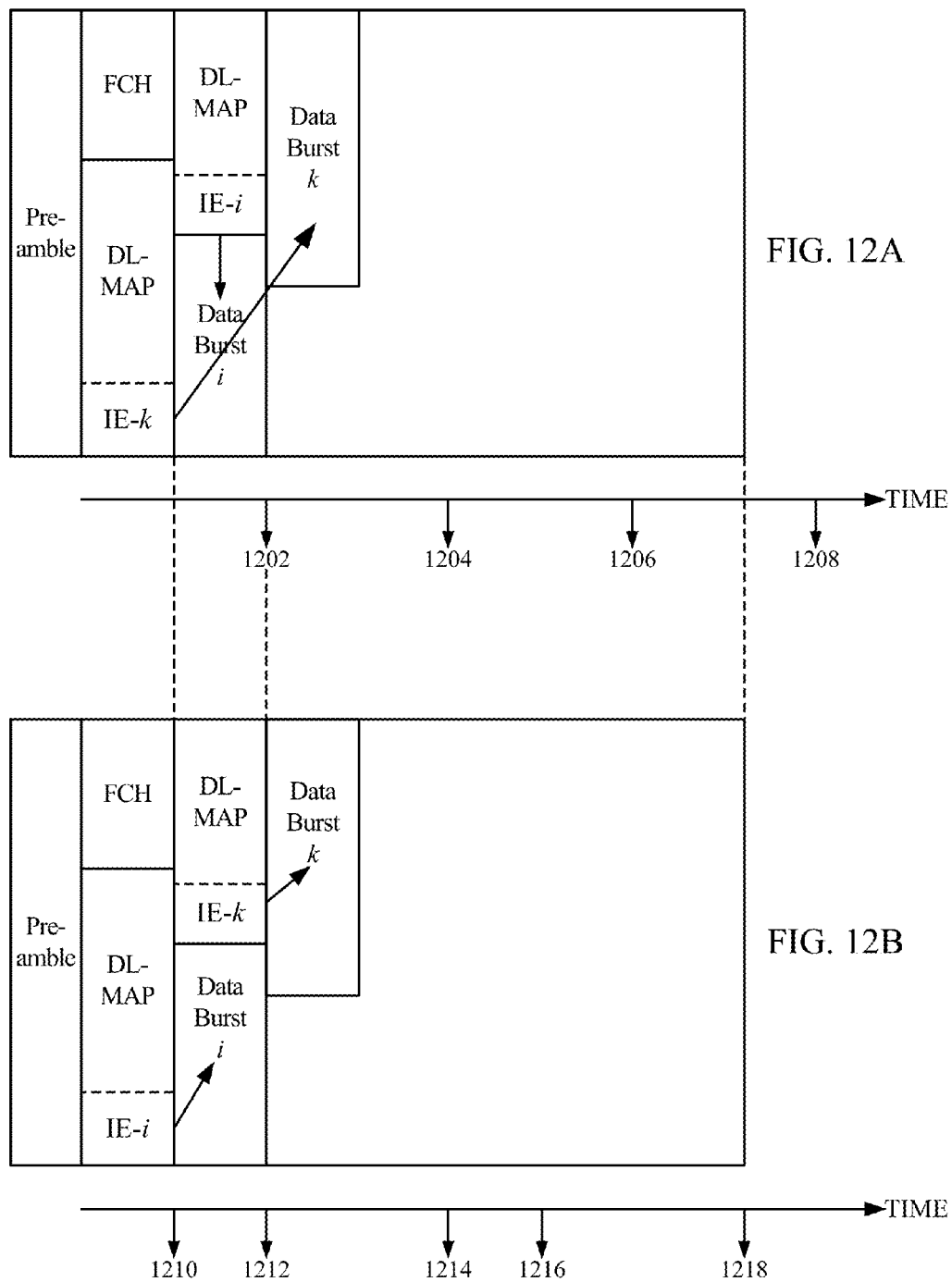
FIGS. 12A and 12B illustrate the processing speed advantage of arranging DL-MAP IEs to correspond to DL data bursts chronologically at a base station such that a user terminal may perform data burst decoding while simultaneously parsing the DL-MAP IEs, in accordance with certain embodiments of the present disclosure.

FIGS. 12A and 12B illustrate the processing speed advantage of arranging DL-MAP IEs 514 to correspond to DL data bursts 600 chronologically at a base station 104 such that a user terminal 106 may perform data burst decoding while simultaneously parsing the DL-MAP IEs, as described above. FIG. 12A illustrates the example DL subframe 402 presented in FIG. 6, while FIG. 12B illustrates the example DL subframe 402 presented in FIG. 8.

Referring now to FIG. 12A where the sequence of the DL-MAP IEs 514 in the DL-MAP 414 does not correspond to the temporal order of the DL data bursts 600 in the DL subframe 402, the user terminal 106 may begin parsing/decoding DL-MAP IEs i and k at 1202. At 1204, the user terminal 106 may complete the parsing/decoding of DL-MAP IEs i and k and begin decoding data burst i. With the example DL subframe 402 of FIG. 12A, the user terminal 106 cannot begin decoding the data bursts until the DL-MAP has been completely parsed. At 1206, the user terminal may finish decoding data burst i and may begin decoding data burst k. At 1208, the user terminal may finish decoding data burst k.

In FIG. 12B, however, where the DL-MAP IEs 514 correspond chronologically to the DL data bursts 600 according to symbol order within the DL subframe 402, data burst decoding may get started earlier, and therefore, all of the data bursts may be decoded quicker than with the DL subframe arrangement of FIG. 12A. Therefore, a DL subframe 402 arranged according to embodiments of the present disclosure may likely enjoy a processing speed advantage, as well as loosened time constraints for parsing the DL-MAP 414 and/or processing the remaining portion of the DL subframe.

In FIG. 12B, the user terminal 106 may start parsing/decoding DL-MAP IE i at 1210 once the complete DL-MAP IE i has been received (as illustrated at 1104 of FIG. 11). At 1212, the user terminal 106 may complete the parsing/decoding of DL-MAP IE i and begin decoding data burst i once this data burst is available (as illustrated at 1112 of FIG. 11). Notice that decoding data burst i has begun before DL-MAP IE k has been parsed/decoded and before data burst k has been received. With the example DL subframe 402 of FIG. 12B, the user terminal 106 may begin decoding the data bursts as soon as the first data burst has been received and the DL-MAP IE 514 for locating that first data burst has been parsed from the DL-MAP 414. Starting data burst decoding earlier and allowing for data burst decoding while continuing to parse the DL-MAP 414 may provide for increased processing speed, since the entire OFDM/OFDMA frame 400 may be completely processed at an earlier time.

At 1214, the user terminal 106 may finish decoding data burst i and may begin parsing/decoding DL-MAP IE k, as long as IE k has been received. At 1216, the user terminal may complete the parsing/decoding of DL-MAP IE k and begin decoding data burst k once this data burst is available. At 1218, the user terminal 106 may finish decoding data burst k, noticeably quicker than at 1208 in FIG. 12A.

In FIGS. 12A and 12B, the time for decoding a certain data burst is constant. Thus, the time for decoding data burst i (i.e., the time between 1204 and 1206 and between 1212 and 1214) is constant, and the time for decoding data burst k (i.e., the time between 1206 and 1208 and between 1216 and 1218) is constant. Furthermore, the time for parsing/decoding a particular DL-MAP IE is constant. Thus, the combined time for parsing DL-MAP IEs i and k is constant in FIGS. 12A and 12B (i.e., the time between 1202 and 1204 is equal to the sum of the time between 1210 and 1212 and between 1214 and 1216). Thus, the difference between processing times in FIGS. 12A and 12B is the parsing time for DL-MAP IE k, which is saved in FIG. 12B since data burst decoding starts after the first DL-MAP IE is parsed and decoded and continues while continuing to parse the DL-MAP 414. With additional DL-MAP IEs 514, the time savings would be potentially increased by the sum of the parsing times for each of the DL-MAP IEs after the first DL-MAP IE.

Figure 7A:
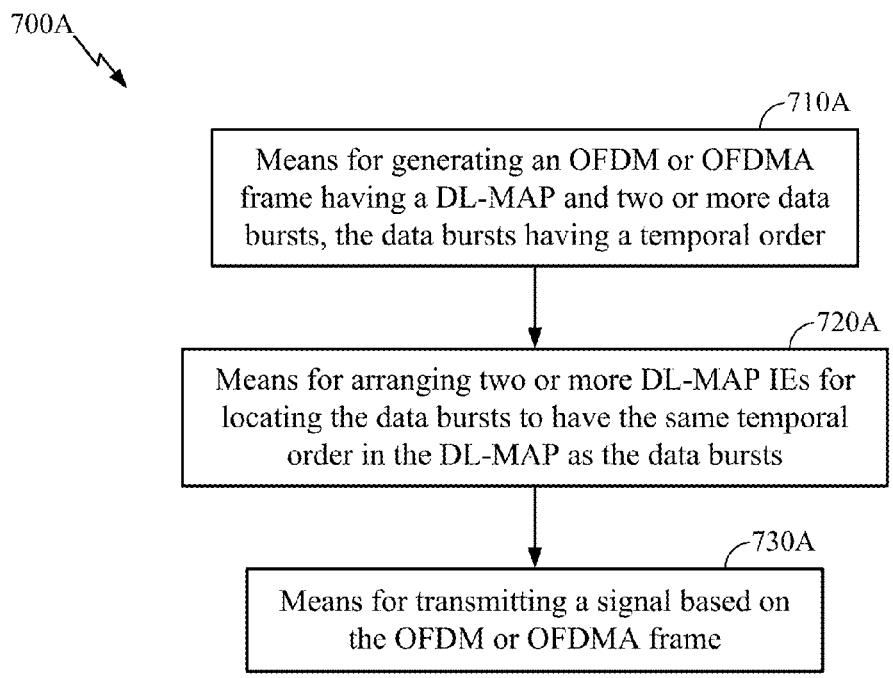
FIG. 7A is a block diagram of means corresponding to the example operations of FIG. 7 for transmitting an OFDM/OFDMA frame having DL-MAP IEs that correspond to DL data bursts in the frame chronologically, in accordance with certain embodiments of the present disclosure.
Figure 9A:
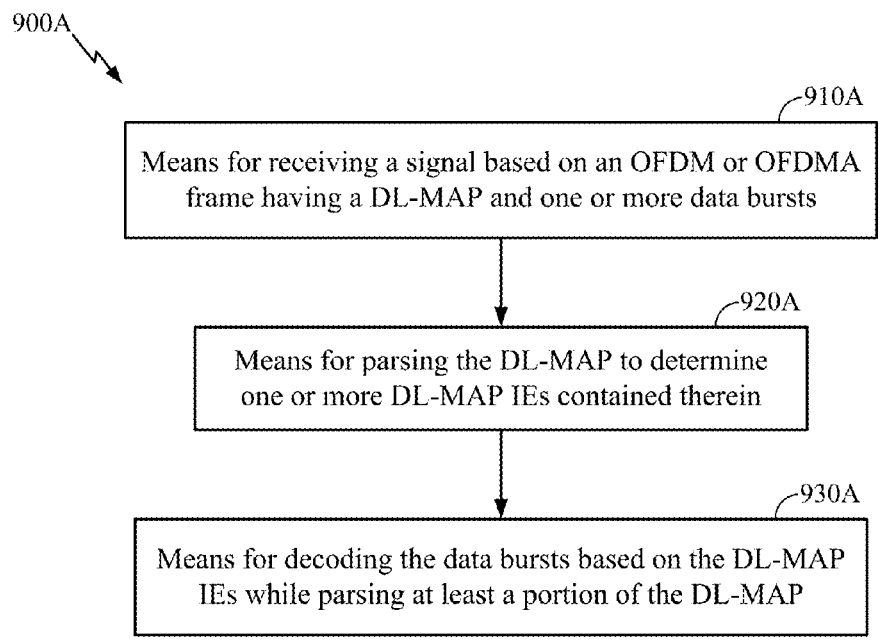
FIG. 9A is a block diagram of means corresponding to the example operations of FIG. 9 for performing DL data burst decoding while parsing the DL-MAP of an OFDM/OFDMA frame, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 710-730 illustrated in FIG. 7 correspond to means-plus-function blocks 710A-730A illustrated in FIG. 7A, and blocks 910-930 illustrated in FIG. 9 correspond to means-plus-function blocks 910A-930A illustrated in FIG. 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications via orthogonal frequency-division multiplexing (OFDM) or orthogonal frequency division multiple access (OFDMA), comprising:
    generating an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
    arranging two or more DL-MAP information elements (IEs) for locating the data bursts to have the same temporal order in the DL-MAP as the data bursts; and
    transmitting a signal based on the OFDM or OFDMA frame with the arranged DL-MAP IEs.

2. The method of claim 1, wherein the temporal order of the data bursts is based on starting symbols of the data bursts.

3. The method of claim 2, wherein a first data burst has an earlier starting symbol than a second data burst and a first DL-MAP IE for locating the first data burst is arranged in the DL-MAP no later than a second DL-MAP IE for locating the second data burst.

4. The method of claim 3, wherein the first DL-MAP IE is arranged in the DL-MAP earlier than the second DL-MAP IE.

5. A computer-program product for wireless communications via orthogonal frequency-division multiplexing (OFDM) or orthogonal frequency division multiple access (OFDMA), the computer-program product comprising a non-transitory computer-readable medium having instructions stored thereon, the instructions being executable by one or more processors and the instructions comprising:
    instructions for generating an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
    instructions for arranging two or more DL-MAP information elements (IEs) for locating the data bursts to have the same temporal order in the DL-MAP as the data bursts; and
    instructions for transmitting a signal based on the OFDM or OFDMA frame with the arranged DL-MAP IEs.

6. The computer-program product of claim 5, wherein the temporal order of the data bursts is based on starting symbols of the data bursts.

7. The computer-program product of claim 6, wherein a first data burst has an earlier starting symbol than a second data burst and a first DL-MAP IE for locating the first data burst is arranged in the DL-MAP no later than a second DL-MAP IE for locating the second data burst.

8. The computer-program product of claim 7, wherein the first DL-MAP IE is arranged in the DL-MAP earlier than the second DL-MAP IE.

9. An apparatus for wireless communications via orthogonal frequency-division multiplexing (OFDM) or orthogonal frequency division multiple access (OFDMA), comprising:
    means for generating an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
    means for arranging two or more DL-MAP information elements (IEs) for locating the data bursts to have the same temporal order in the DL-MAP as the data bursts; and
    means for transmitting a signal based on the OFDM or OFDMA frame with the arranged DL-MAP IEs.

10. The apparatus of claim 9, wherein the temporal order of the data bursts is based on starting symbols of the data bursts.

11. The apparatus of claim 10, wherein a first data burst has an earlier starting symbol than a second data burst and a first DL-MAP IE for locating the first data burst is arranged in the DL-MAP no later than a second DL-MAP IE for locating the second data burst.

12. The apparatus of claim 11, wherein the first DL-MAP IE is arranged in the DL-MAP earlier than the second DL-MAP IE.

13. A wireless device for wireless communications via orthogonal frequency-division multiplexing (OFDM) or orthogonal frequency division multiple access (OFDMA), comprising:
    logic for generating an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;

logic for arranging two or more DL-MAP information elements (IEs) for locating the data bursts to have the same temporal order in the DL-MAP as the data bursts; and a transmitter front end configured to transmit a signal based on the OFDM or OFDMA frame with the arranged DL-MAP IEs.

14. The wireless device of claim 13, wherein the temporal order of the data bursts is based on starting symbols of the data bursts.

15. The wireless device of claim 14, wherein a first data burst has an earlier starting symbol than a second data burst and a first DL-MAP IE for locating the first data burst is arranged in the DL-MAP no later than a second DL-MAP IE for locating the second data burst.

16. The wireless device of claim 15, wherein the first DL-MAP IE is arranged in the DL-MAP earlier than the second DL-MAP IE.

17. A method of wireless communications via orthogonal frequency-division multiplexing (OFDM) or orthogonal frequency division multiple access (OFDMA), comprising:
receiving a signal based on an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
parsing the DL-MAP to determine one or more DL-MAP information elements (IEs) contained therein for locating the data bursts; and
decoding the data bursts based on the DL-MAP IEs while parsing at least a portion of the DL-MAP.

18. The method of claim 17, wherein the DL-MAP IEs correspond chronologically to the data bursts.

19. The method of claim 18, wherein the DL-MAP IEs correspond chronologically to the data bursts based on starting symbols of the data bursts.

20. The method of claim 19, wherein a first data burst has an earlier starting symbol than a second data burst and a first DL-MAP IE for locating the first data burst is arranged in the DL-MAP no later than a second DL-MAP IE for locating the second data burst.

21. The method of claim 20, wherein the first DL-MAP IE is arranged in the DL-MAP earlier than the second DL-MAP IE.

22. The method of claim 18, wherein the DL-MAP IEs correspond chronologically to the data bursts based on ending symbols of the data bursts.

23. The method of claim 17, further comprising:
storing successfully decoded data from the data bursts;
forwarding the stored data to one or more Open Systems Interconnection (OSI) Reference Model layers if a cyclic redundancy check (CRC) passes; and
discarding the stored data if the CRC fails.

24. A computer-program product for wireless communications via orthogonal frequency-division multiplexing (OFDM) or orthogonal frequency division multiple access (OFDMA), the computer-program product comprising a non-transitory computer-readable medium having instructions stored thereon, the instructions being executable by one or more processors and the instructions comprising:
instructions for receiving a signal based on an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
instructions for parsing the DL-MAP to determine one or more DL-MAP information elements (IEs) contained therein for locating the data bursts; and
instructions for decoding the data bursts based on the DL-MAP IEs while parsing at least a portion of the DL-MAP.

25. The computer-program product of claim 24, wherein the DL-MAP IEs correspond chronologically to the data bursts.

26. The computer-program product of claim 25, wherein the DL-MAP IEs correspond chronologically to the data bursts based on starting symbols of the data bursts.

27. The computer-program product of claim 26, wherein a first data burst has an earlier starting symbol than a second data burst and a first DL-MAP IE for locating the first data burst is arranged in the DL-MAP no later than a second DL-MAP IE for locating the second data burst.

28. The computer-program product of claim 27, wherein the first DL-MAP IE is arranged in the DL-MAP earlier than the second DL-MAP IE.

29. The computer-program product of claim 25, wherein the DL-MAP IEs correspond chronologically to the data bursts based on ending symbols of the data bursts.

30. The computer-program product of claim 24, further comprising:
instructions for storing successfully decoded data from the data bursts;
instructions for forwarding the stored data to one or more Open Systems Interconnection (OSI) Reference Model layers if a cyclic redundancy check (CRC) passes; and
instructions for discarding the stored data if the CRC fails.

31. An apparatus for wireless communications via orthogonal frequency-division multiplexing (OFDM) or orthogonal frequency division multiple access (OFDMA), comprising:
means for receiving a signal based on an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
means for parsing the DL-MAP to determine one or more DL-MAP information elements (IEs) contained therein for locating the data bursts; and
means for decoding the data bursts based on the DL-MAP IEs while parsing at least a portion of the DL-MAP.

32. The apparatus of claim 31, wherein the DL-MAP IEs correspond chronologically to the data bursts.

33. The apparatus of claim 32, wherein the DL-MAP IEs correspond chronologically to the data bursts based on starting symbols of the data bursts.

34. The apparatus of claim 33, wherein a first data burst has an earlier starting symbol than a second data burst and a first DL-MAP IE for locating the first data burst is arranged in the DL-MAP no later than a second DL-MAP IE for locating the second data burst.

35. The apparatus of claim 34, wherein the first DL-MAP IE is arranged in the DL-MAP earlier than the second DL-MAP IE.

36. The apparatus of claim 32, wherein the DL-MAP IEs correspond chronologically to the data bursts based on ending symbols of the data bursts.

37. The apparatus of claim 31, further comprising:
   means for storing successfully decoded data from the data bursts;
   means for forwarding the stored data to one or more Open Systems Interconnection (OSI) Reference Model layers if a cyclic redundancy check (CRC) passes; and
   means for discarding the stored data if the CRC fails.

38. A wireless device for wireless communications via orthogonal frequency-division multiplexing (OFDM) or orthogonal frequency division multiple access (OFDMA), comprising:
   a receiver front end configured to receive a signal based on an OFDM or OFDMA frame having a downlink map (DL-MAP) and two or more data bursts, the data bursts having a temporal order, wherein the temporal order of the data bursts is based on ending symbols of the data bursts when the data bursts share a same starting symbol such that a data burst having an intermediate ending symbol is not earlier than a data burst having an earlier ending symbol and not later than a data burst having a later ending symbol;
   a MAP parser configured to parse the DL-MAP to determine one or more DL-MAP information elements (IEs) contained therein for locating the data bursts; and
   a data burst decoder configured to decode the data bursts based on the DL-MAP IEs while parsing at least a portion of the DL-MAP.

39. The wireless device of claim 38, wherein the DL-MAP IEs correspond chronologically to the data bursts.

40. The wireless device of claim 39, wherein the DL-MAP IEs correspond chronologically to the data bursts based on starting symbols of the data bursts.

41. The wireless device of claim 40, wherein a first data burst has an earlier starting symbol than a second data burst and a first DL-MAP IE for locating the first data burst is arranged in the DL-MAP no later than a second DL-MAP IE for locating the second data burst.

42. The wireless device of claim 41, wherein the first DL-MAP IE is arranged in the DL-MAP earlier than the second DL-MAP IE.

43. The wireless device of claim 39, wherein the DL-MAP IEs correspond chronologically to the data bursts based on ending symbols of the data bursts.

44. The wireless device of claim 38, further comprising:
   memory for storing successfully decoded data from the data bursts;
   logic for forwarding the stored data to one or more Open Systems Interconnection (OSI) Reference Model layers if a cyclic redundancy check (CRC) passes; and
   logic for discarding the stored data if the CRC fails.

* * * * *